United States Patent Office 3,225,093
Patented Dec. 21, 1965

3,225,093
HALOALKYLENETHIOPHENYL AMIDES
John Krapcho, Somerset, N.J., assignor to Olin Mathieson Chemical Corporation, New York, N.Y., a corporation of Virginia
No Drawing. Filed Mar. 1, 1965, Ser. No. 436,316
11 Claims. (Cl. 260—558)

This application is a continuation-in-part of application Serial No. 397,266, filed September 17, 1964, now U.S. Patent 3,201,401, which in turn is a continuation-in-part of application Serial No. 194,962, filed May 15, 1962, and of application Serial No. 368,988, filed May 20, 1964, the last two now being abandoned.

This invention relates to intermediates which are useful for the preparation of products in the aforementioned applications. The compounds of this invention have the formula (I)
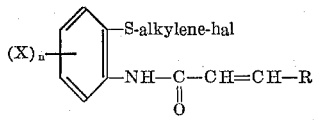

wherein:

R is hydrogen, lower alkyl, cycloalkyl, $(X)_n$-phenyl, furyl, thienyl, pyridyl or piperonyl, X is hydrogen, halogen, trifluoromethyl, nitro, lower alkyl, lower alkoxy or lower alkanoyl, $n$ is 1, 2 or 3 and hal is a halogen.

The alkylene group in the sulfur containing side chain may be a straight or branched aliphatic hydrocarbon chain of up to about 12 carbon atoms. These include saturated divalent chains such as methylene, ethylene, propylene, isopropylene, butylene and long polymethylene chains. Lower alkylene groups are, however, preferred.

Lower alkyl groups represented by R and by X include groups such as methyl, ethyl, propyl, isopropyl, butyl, sec-butyl, t-butyl, amyl and the like. The lower alkoxy groups are ether groups containing lower alkyl groups of the type just referred to linked to the oxygen and the lower alkanoyl groups are acyl radicals of the same character. The cycloalkyl groups are cycloaliphatic groups containing preferably 3 to 7 carbon atoms.

All four halogens are included, but chlorine and bromine are preferred, especially the former.

Preferred are those of Formula I wherein R is phenyl, X is hydrogen and the halogen is chlorine.

The compounds of Formula I are produced by cleaving the ring of a benzothiazepin-4-one of the formula (II)
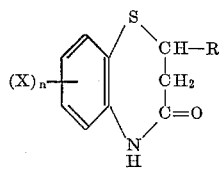

wherein R, X and $n$ have the same meaning as above, e.g., with an alkali metal compound such as sodamide, an alkali metal hydroxide or alkali metal alkoxide to obtain a compound of the formula (III)
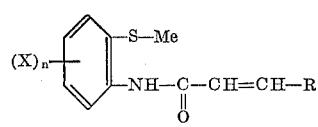

wherein Me is an alkali metal and R, X and $n$ have the same meaning as before.

The compound of Formula III is then reacted with a haloalkyl halide to produce a product of Formula I. Treatment of the product of Formula I with an alkali metal halide such as sodium iodide and with an amine such as methylamine, dimethylamine, diethanolamine or the like or with a nitrogen heterocyclic such as piperazine, 1-(o-methoxyphenyl)piperazine, 1-phenylpiperazine, 4-(2-hydroxyethyl)piperazine or the like results in sulfur containing products having serotonin inhibitory, hypotensive, central depressant and analgesic activity described in the above identified parent applications.

The cleavage of the benzothiazepinone of Formula II may be effected, for example, by forming a solution of the starting material and the alkali metal agent in a solvent, preferably an alkanol, such as isopropyl alcohol. Heat may be applied, if desired, up to about reflux temperature of the solution. The second step, reaction with the haloalkyl halide, may be effected, if desired, without separation of the intermediate product by adding the haloalkyl halide to the cooled alcoholic solution. Ambient temperature generally suffices but preferably heat, up to about reflux temperature, is applied to accelerate the reaction. The product of Formula I may then be isolated by conventional procedures from the reaction mixture. Then to obtain the end products of the parent applications identified previously, the compound of Formula I may be reacted as described in those parent applications with sodium iodide in acetone and then with an amine compound in an organic solvent such as toluene.

The following examples are illustrative of the invention. All temperatures are expressed on the centigrade scale.

EXAMPLE 1

*Preparation of 2'-(3-chloropropylthio)cinnamanilide*

A suspension of 71.0 g. of 2,3-dihydro-2-phenyl-1,5-benzothiazepin-4(5H)-one in 130 ml. of isopropyl alcohol is added to a stirred solution of 15 g. of sodium methoxide in 400 ml. of isopropyl alcohol and the mixture is refluxed for 20 minutes. The orange-red solution is cooled to 40°, treated with 52 g. of trimethylenechlorobromide and the mixture is refluxed for 5 hours. The bulk of the solvent is removed under reduced pressure; the residue is cooled and threated with 1 l. of water and 400 ml. of hexane. The product is filtered, washed with water and dried; yield 83 g., M.P. 110–112°. A sample crystallized from isopropyl alcohol melts at 114–116°.

EXAMPLE 2

Following the procedure of Example 1, but substituting an equivalent quantity of 7-chloro-2,3-dihydro-2-phenyl-1,5-benzothiazepin-4(5H)-one as starting material, 5'-chloro-2'-(3-chloropropylthio)cinnamanilide is obtained.

EXAMPLE 3

Following the procedure of Example 1, but substituting an equivalent quantity of 2,3-dihydro-2-(o-methoxyphenyl)-1,5-benzothiazepin-4(5H)-one as starting material, 2'-(3-chloropropylthio)-o-methoxycinnamanilide is obtained.

EXAMPLE 4

*Preparation of 2'-(2-chloroethylthio)cinnamanilide*

Interaction of 36.0 g. of 2,3-dihydro-2-phenyl-1,5-benzothiazepin-4(5H)-one, 7.6 g. of sodium methoxide, 25.0 g. of ethylene chlorobromide in 265 ml. of isopropyl alcohol according to the procedure of Example 1 gives 41 g. of product, M.P. 92–95°. Crystallization from 400 ml. of isopropyl alcohol yields 35.0 g. of material, M.P. 109–112°. After crystallization from 220 ml. of acetonitrile, the colorless product 2'-(2-chloroethylthio)cinnamanilide weighs 26.0 g., M.P. 110–112°.

By substitution of tetramethylene chlorobromide and pentamethylene chlorobromide for the ethylene chlorobromide, 2'-(4-chlorobutylthio)cinnamanilide and 2'-(5-chloropentylthio)-cinnamanilide, respectively, are obtained.

EXAMPLE 5

Following the procedure of Example 1 but substituting an equivalent quantity of 7,8-diacetyl-2,3-dihydro-2-phenyl-1,5-benzothiazepin-4(5H)-one as starting material, 4',5'-diacetyl-2'-(3-chloropropylthio)cinnamanilide is obtained.

By substituting other phenyl ring substituted benzothiazepinones for the starting material in Example 1, additional products bearing 1 or more of the substituents X on the phenyl ring may be obtained.

EXAMPLE 6

Following the procedure of Example 1 but substituting an equivalent quantity of 2,3-dihydro-2-furyl-1,5-benzothiazepin-4(5H)-one or 2,3-dihydro-2-piperonyl-1,5-benzothiazepin-4(5H)-one as starting material, 2'-(3-chloropropylthio)-2-furanacrylanilide or 2'-(3-chloropropylthio)piperonylacrylanilide, respectively, is obtained.

EXAMPLE 7

Following the procedure of Example 1, but substituting an equivalent quantity of 7-trifluoromethyl-2,3-dihydro-2-phenyl-1,5-benzothiazepin-4(5H)-one as starting material, 5'-trifluoromethyl - 2'-(3-chloropropylthio)cinnamanilide is obtained.

EXAMPLE 8

Following the procedure of Example 1, but substituting an equivalent quantity of 2,3-dihydro-1,5-benzothiazepin-4(5H)-one and 2,3-dihydro-2-methyl-1,5-benzothiazepin-4(5H)-one for the 2,3-dihydro-2-phenyl-1,5-benzothiazepin-4(5H)-one there is obtained 2'-(3-chloropropylthio)acrylanilide and 2' - (3 - chloropropylthio)methylacrylanilide, respectively.

What is claimed is:
1. A compound of the formula

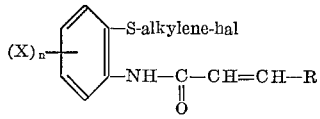

wherein:
the alkylene group has up to about 12 carbon atoms,
R is a member of the group consisting of hydrogen, lower alkyl, (X)$_n$-phenyl, furyl, thienyl, pyridyl and piperonyl, X is a member of the group consisting of hydrogen, halogen, trifluoromethyl, nitro, lower alkyl, lower alkoxy and lower alkanoyl, $n$ is an integer from 1 to 3 and hal is halogen.

2. A compound of the formula

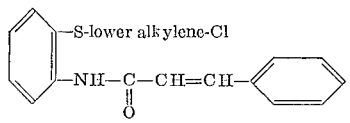

3. A compound of the formula

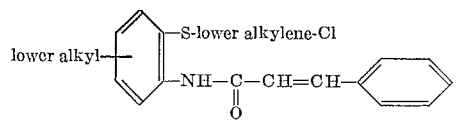

4. A compound of the formula

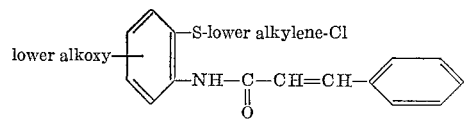

5. A compound of the formula

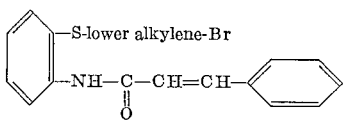

6. A compound of the formula

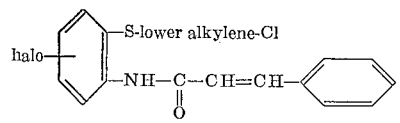

7. 2'-(3-chloropropylthio)cinnamanilide.
8. 2'-(2-chloroethylthio)cinnamanilide.
9. 5'-halo-2'-(3-chloropropylthio)cinnamanilide.
10. 5'-chloro-2'(3-chloropropylthio)cinnamanilide.
11. 2'(3-chloropropylthio)-o-methoxycinnamanilide.

References Cited by the Examiner
UNITED STATES PATENTS

| | | | |
|---|---|---|---|
| 2,479,295 | 8/1949 | Behrens et al. | 260—559 |
| 2,753,345 | 7/1956 | Wright | 260—558 |
| 2,761,873 | 9/1956 | Gregory et al. | 260—558 |

WALTER A. MODANCE, *Primary Examiner.*

NATALIE TROUSOF, *Assistant Examiner.*